United States Patent
Okuyama et al.

(10) Patent No.: US 10,968,408 B2
(45) Date of Patent: Apr. 6, 2021

(54) GASOLINE COMPOSITION AND PRODUCTION PROCESS THEREFOR

(71) Applicant: Showa Shell Sekiyu K. K., Tokyo (JP)

(72) Inventors: Yasuyo Okuyama, Tokyo (JP); Akio Imai, Tokyo (JP); Mitsuru Koike, Tokyo (JP); Shinya Sasaki, Tokyo (JP)

(73) Assignee: IDEMITSU KOSAN CO., LTD, Tokyo (JP)

( * ) Notice: Subject to any disclaimer, the term of this patent is extended or adjusted under 35 U.S.C. 154(b) by 0 days.

(21) Appl. No.: 16/320,190

(22) PCT Filed: Jul. 24, 2017

(86) PCT No.: PCT/JP2017/026679
§ 371 (c)(1),
(2) Date: Jan. 24, 2019

(87) PCT Pub. No.: WO2018/021235
PCT Pub. Date: Feb. 1, 2018

(65) Prior Publication Data
US 2019/0225899 A1 Jul. 25, 2019

(30) Foreign Application Priority Data

Jul. 26, 2016 (JP) .............................. JP2016-146057

(51) Int. Cl.
*C10L 1/16* (2006.01)
*C10L 1/06* (2006.01)
*C10L 10/02* (2006.01)

(52) U.S. Cl.
CPC ............... *C10L 1/1608* (2013.01); *C10L 1/06* (2013.01); *C10L 1/16* (2013.01); *C10L 10/02* (2013.01); *C10L 2200/0423* (2013.01); *C10L 2200/0469* (2013.01); *C10L 2270/023* (2013.01); *C10L 2290/24* (2013.01)

(58) Field of Classification Search
CPC ..... C10L 2200/0423; C10L 2200/0469; C10L 1/1608; C10L 1/16; C10L 2290/24; C10L 2270/023
USPC ........................................ 585/14; 208/16, 17
See application file for complete search history.

(56) References Cited

U.S. PATENT DOCUMENTS

| | | | | |
|---|---|---|---|---|
| 5,401,280 | A * | 3/1995 | Kaneko | C10L 1/023 44/449 |
| 5,516,960 | A | 5/1996 | Robinson | |
| 2014/0273118 | A1* | 9/2014 | Held | C07C 45/60 435/136 |

FOREIGN PATENT DOCUMENTS

| | | |
|---|---|---|
| CN | 1376192 A | 10/2002 |
| JP | H10-121064 A | 5/1998 |
| JP | 2000-073074 A | 3/2000 |
| JP | 2008-182925 A | 8/2008 |
| JP | 2010-535703 A | 11/2010 |
| JP | 2016-033129 A | 3/2016 |
| WO | 01/23503 A1 | 4/2001 |
| WO | 2008/109877 A1 | 9/2008 |
| WO | 2009/079213 A2 | 6/2009 |
| WO | 2012/162403 A1 | 11/2012 |

OTHER PUBLICATIONS

International Search Report for International Application No. PCT/JP2017/026679, dated Aug. 29, 2017.
Japanese Office action for 2017-559471 dated Dec. 19, 2017.
Japanese Decision of Refusal for 2017-559471 dated Apr. 3, 2018.
Japanese Office action for 2017-559471 dated Aug. 14, 2018.
Humbird et al., "Process Design and Economics for Biochemical Conversion of Lignocellulosic Biomass to Ethanol", Dilute-Acid Pretreatment and Enzymatic Hydrolysis of Corn Stover, Technical Report NREL/TP-5100-47764, May 2011.
Liu et al., "Selective transformation of hemicellulose (xylan) into n-pentane, pentanols or xylitol over a rhenium-modified indium catalyst combined with acids", Green Chem, 2016, 18, pp. 165-175.
Liu, et al., "Production of Renewable Hexanols from Mechanocatalytically Depolymerized Cellulose by Using Ir-ReOx/SiO2 catalyst", ChemSusChem, Wiley Online Library, 2015, 8, 628-635.
Nakamura, "Gas Chromatographic Analysis of Catalytic Cracked Gasoline", AJoumal of the Japan Petroleum Institute, 1973,vol. 16 (1), pp. 51-58.
Lenhert et al., "The oxidation of a gasoline surrogate in the negative temperature coefficient region", Combustion and Flame, Elsevier Science Publishing Co., Inc., New York, NY; US, Amsterdam, NL, vol. 156, No. 3, Mar. 1, 2009, pp. 549-564.
Extended European Search Report for 17 83 4241 dated Jan. 28, 2020.
Chinese Office Action issued in Chinese Patent Application No. 201780045708.0 dated Jun. 10, 2020.
India Office Action issued in India Patent Application No. 201817049491 dated Jun. 11, 2020.

* cited by examiner

*Primary Examiner* — Thuan D Dang
(74) *Attorney, Agent, or Firm* — Pearne & Gordon LLP

(57) ABSTRACT

It is an object of the present invention to provide a gasoline composition utilizing lignocellulosic biomass, which is a plant-derived resource that does not cause competition with food production, the gasoline composition satisfying properties required for use in gasoline engines, and a process for producing the gasoline composition. The gasoline composition contains 0.3 to 10.0 vol % of hemicellulose-derived pentene.

3 Claims, No Drawings

GASOLINE COMPOSITION AND PRODUCTION PROCESS THEREFOR

TECHNICAL FIELD

The present invention relates to a gasoline composition utilizing lignocellulosic biomass and a process for producing the composition.

BACKGROUND ART

Using biofuels for reducing greenhouse gas emissions has been expected because biofuels are carbon neutral.

In recent years, environmental destruction has been worse and the environment is concerned so that a reduction of environmental burden from automotive gasoline has become a social demand. To response to such a social demand, using bioethanol produced from corn, sugarcane or the like for the production of automotive gasoline has been attempted.

So-called biofuels, which are fuels including bioethanol produced from plants as raw materials, can satisfy the GHG (greenhouse gas) emissions standard but a kind of plants used as the raw materials are limited. Currently, corn, sugarcane and the like are mainly used as the raw materials but these plants are also used for food. Thus, production of ethanol may cause competition with food production.

Accordingly, methods of producing biofuels that do not cause competition with food production have been studied. For example, in Patent Literature 1, a method for producing ethanol from cellulose that constitutes non-food portions such as stems and leaves usually discarded is proposed. In Non Patent Literature 1, a process for producing bioethanol is described.

CITATION LIST

Patent Literature

Patent Literature 1: Japanese Patent Laid-Open No. 2008-182925

Non Patent Literature

Non Patent Literature 1: Process Design and Economics for Biochemical Conversion of Lignocellulosic Biomass to Ethanol Dilute-Acid Pretreatment and Enzymatic Hydrolysis of Corn Stover, Technical Report NREL/TP-5100-47764 May 2011

SUMMARY OF INVENTION

Technical Problem

According to the method for producing biofuels using cellulose, it is possible to reduce an amount of carbon dioxide emissions as GHG without competition with food production. However, ethanol produced by this method is expensive.

In addition, ethanol is highly reactive to metals compared with petroleum-derived gasoline components. If a large amount of ethanol is used, ethanol may corrode aluminum materials in fuel supply systems of automobiles, and then fuel leakage may occur. Thus, currently in Japan, it does not allow including more than 3% of ethanol and a large amount of ethanol cannot be added.

Accordingly, it is an object of the present invention to provide a gasoline composition utilizing lignocellulosic biomass, which is a plant-derived resource that does not cause competition with food production, the composition satisfying properties required for use in gasoline engines, and a process for producing the gasoline composition.

Solution to Problem

In order to achieve the above object, the present inventors have earnestly studied, and as a result, they have found that the properties required for use in gasoline engines are satisfied by using pentene produced from hemicellulose contained in lignocellulosic biomass. That is to say, one aspect of the present invention is a gasoline composition containing 0.3 to 10.0 vol % of hemicellulose-derived pentene. Another aspect of the present invention is a method for producing a gasoline composition, including adding 0.3 to 10.0 vol % of hemicellulose-derived pentene.

Advantageous Effects of Invention

As described above, the present invention can provide a gasoline composition utilizing lignocellulosic biomass, which is a plant-derived resource that does not cause competition with food production, the composition satisfying properties required for use in gasoline engines, and can provide a method for producing the gasoline composition.

DESCRIPTION OF EMBODIMENTS

<<Gasoline Composition>>

The gasoline composition according to the present invention includes pentene that is produced from hemicellulose contained in lignocellulosic biomass (hereinafter referred to as hemicellulose-derived pentene). The lignocellulosic biomass is biomass mainly constituted of cellulose, hemicellulose and lignin. Examples of such lignocellulosic biomass include agriculture and forestry resources, such as hardwood tree, softwood tree, straw of rice, straw of barley, rice hull, corn stover, bagasse, switch grass, erianthus, napier grass and Japanese pampas grass, and their wastes and energy crops, and wood chips, wood wastes, pulps and waste papers derived from them. The lignocellulosic biomass is a plant-derived resource that does not cause competition with food production, and it brings about no food problem. In the present invention, pentene produced from hemicellulose, not ethanol produced from hemicellulose, is blended with a gasoline component to prepare a biofuel. The pentene can be used in a large amount as a substitute for petroleum fuel because a content of the hemicellulose-derived pentene in gasoline is not restricted unlike a content of ethanol.

The gasoline composition according to the present invention includes 0.3 to 10.0 vol %, and preferably 0.5 to 9.0 vol % of hemicellulose-derived pentene. If the content of the hemicellulose-derived pentene is smaller, the reduction in carbon dioxide emissions may be insufficient. If the content of the hemicellulose-derived pentene is larger, fuel economy may become worse due to a low 50% distillation temperature.

The hemicellulose-derived pentene preferably includes 1-pentene and 2-pentene. In the hemicellulose-derived pentene, a content of 1-pentene is preferably 5.0 to 15.0 vol %, and more preferably 7.0 to 13.0 vol %. A content of 2-pentene is preferably 85.0 to 95.0 vol %, and more preferably 87.0 to 93.0 vol %.

The gasoline composition according to the present invention preferably includes hexene that is produced from cellulose contained in lignocellulosic biomass (hereinafter referred to as cellulose-derived hexene). The lignocellulosic biomass includes not only hemicellulose but also cellulose, so that cellulose can be effectively utilized.

The gasoline composition according to the present invention preferably includes 1.0 to 23.0 vol %, more preferably 1.5 to 23.0 vol %, and still more preferably 2.0 to 22.0 vol % of cellulose-derived hexene. If the content of the cellulose-derived hexene is smaller, the reduction of carbon dioxide emissions may be insufficient. If the content of the cellulose-derived hexene is larger, oxidation stability may decrease.

The cellulose-derived hexene preferably includes at least 1-hexene. In the cellulose-derived hexene, a content of 1-hexene is preferably 1.0 to 15.0 vol %, more preferably 3.0 to 9.0 vol %, and still more preferably 3.0 to 7.0 vol %.

The cellulose-derived hexene preferably includes 1-hexene, 2-hexene and 3-hexene. In the cellulose-derived hexene, a content of 1-hexene is preferably 1.0 to 15.0 vol %, more preferably 3.0 to 9.0 vol %, and still more preferably 3.0 to 7.0 vol %. A content of 2-hexene is preferably 55.0 to 80.0 vol %, more preferably 60.0 to 75.0 vol %, and still more preferably 60.0 to 70.0 vol %. A content of 3-hexene is preferably 10.0 to 40.0 vol %, more preferably 19.0 to 28.0 vol %, and still more preferably 20.0 to 28.0 vol %.

The gasoline composition according to the present invention may include pentene contained in a gasoline component, in addition to the hemicellulose-derived pentene, and a content of pentene in the gasoline composition (hereinafter referred to as a pentene content) is preferably 1.0 to 12.0 vol %, and more preferably 2.0 to 11.0 vol %. In the pentene content, a ratio of (2-pentene content) to (1-pentene content) is preferably 3.0 to 7.0 vol %/vol %, and more preferably 3.3 to 6.5 vol %/vol %. Unless 1-pentene and 2-pentene are separated from each other by fractional distillation or the like after the hemicellulose-derived pentene is produced as described later, the proportion of 2-pentene is high. Accordingly, if the content of the hemicellulose-derived pentene increases, the ratio of (2-pentene content) to (1-pentene content) tends to be high.

The gasoline composition according to the present invention may include hexene contained in a gasoline component, in addition to the cellulose-derived hexene, and a content of hexene in the gasoline composition (hereinafter referred to as a hexene content) is preferably 1.5 to 27.0 vol %, and more preferably 1.5 to 24.0 vol %. If the hexene content is smaller, the $CO_2$ reduction may be insufficient, and if the hexane content is larger, oxidation stability may decrease. In the hexene content, a ratio of (2-hexene content) to (1-hexene content) is preferably 4.5 to 10.0 vol %/vol %, more preferably 5.0 to 9.5 vol %/vol %, and still more preferably 6.0 to 9.0 vol %/vol %. Unless 1-hexene and 2-hexene are separated from each other by fractional distillation or the like after the cellulose-derived hexene is produced as described later, the proportion of 2-hexene is high. Accordingly, if the content of the cellulose-derived hexene increases, the ratio of (2-hexene content) to (1-hexene content) tends to be high.

The gasoline composition according to the present invention may include an olefins content of not less than 15.0 vol %, more preferably not less than 17.0 vol %, more preferably 18.0 to 40.0 vol %, and still more preferably 19.0 to 36.0 vol %. If the olefins content is larger, oxidation stability may decrease. A paraffins content may be 25.0 to 60.0 vol %. A naphthenes content may be 3.0 to 10.0 vol %. An aromatics content may be preferably not less than 15.0 vol %, and more preferably 18.0 to 35.0 vol %. If the aromatics content is smaller, the octane number may be low. If the aromatics content is larger, the exhaust emissions performance may be deteriorated.

A density at 15° C. of the gasoline composition according to the present invention is preferably not less than 0.7000 g/cm³, and more preferably 0.7100 to 0.7300 g/cm³. If the density is lower, the fuel economy may become worse. If the density is higher, the exhaust emissions performance may be deteriorated. A vapor pressure is preferably 44.0 to 93.0 kPa, more preferably 44.0 to 88.0 kPa, and still more preferably 44.0 to 72.0 kPa. If the vapor pressure is lower, startability of engines may become worse. If the vapor pressure is higher, evaporative gas emissions (evaporative emissions) may increase, or engines may stop due to a vapor lock.

A 10% distillation temperature is preferably not higher than 70.0° C., and more preferably 38.0 to 60.0° C. If the 10% distillation temperature is lower, the evaporative gas emissions (evaporative emissions) may increase, or engines may stop due to a vapor lock. If the 10% distillation temperature is higher, startability of engines may become worse. A 50% distillation temperature is preferably not lower than 75.0° C., more preferably 75.0 to 100.0° C., and still more preferably 75.0 to 95.0° C. If the 50% distillation temperature is lower, the fuel economy may become worse. If the 50% distillation temperature is higher, acceleration on engines may be poor. A 90% distillation temperature is preferably not higher than 180.0° C., and more preferably 110.0 to 170.0° C. If the 90% distillation temperature is lower, the fuel economy may become worse. If the 90% distillation temperature is higher, engine failure may occur due to oil dilution.

Oxidation stability is preferably not less than 240 minutes, and more preferably not less than 280 minutes.

An octane number is preferably not less than 90.0.

<<Method for Producing Gasoline Composition>>

The hemicellulose-derived pentene can be obtained by, for example, producing pentanol from hemicellulose contained in lignocellulosic biomass and dehydrating the produced hemicellulose-derived pentanol. Pentanol can be efficiently obtained from hemicellulose in a single reaction vessel by a method in which the hemicellulose in an aqueous phase is saccharified by hydrolysis and also subjected to hydrogenolysis in the presence of an Ir—Re (iridium-rhenium)-based catalyst at a temperature at which hemicellulose is decomposed, and then an oil phase composed of a liquid hydrocarbon is added to dissolve pentanol (Japanese Patent Laid-Open No. 2016-33129).

The Ir—Re-based catalyst basically contains Ir and Re. The catalyst is not specifically restricted but Ir-ReOx/SiO₂ can make it possible to enhance the conversion of hemicellulose and a yield of pentanol. Here, x in ReOx represents an oxidation number and is an arbitrary real number. Particularly in the case of Ir-ReOx/SiO₂, it is preferable that the molar ratio of Re to Ir be not less than 1 to obtain pentanol with a higher yield.

As the oil phase, for example, saturated hydrocarbons, such as normal paraffins, isoparaffins and cycloparaffins, or aromatic hydrocarbons are preferable.

The oil phase does not inhibit the reactions in the aforementioned hydrolysis step and hydrogenolysis step. For example, if ethers are used as solvents, they may not function as the oil phase for dissolving alcohols because the ethers themselves are decomposed. Alcohols having an OH group may lower catalytic functions because the alcohols adsorb on the catalyst and cover active sites of the catalyst. Unsaturated hydrocarbons, such as olefinic hydrocarbons, decrease the yield of pentanol because the unsaturated hydrocarbons themselves are hydrogenated, consuming hydrogen for hydrogenation of glucose and hydrogenolysis of sorbitol. Aromatic hydrocarbons can also be hydrogenated but they can be used as the solvents due to a low reaction rate.

The oil phase is required to be a liquid phase (liquid) at temperatures and pressures in reaction conditions with the Ir—Re-based catalyst. Because the reaction conditions for the catalyst are typically 140° C. to 200° C. and 1 MPa to 10 MPa, a boiling point of the solvent at 1 MPa is not lower than 140° C., preferably not lower than 200° C., and more preferably not lower than 290° C. If the oil phase becomes a solid phase at a time when it is taken out, it is difficult to recover the alcohols. Accordingly, it is preferable to maintain a liquid phase even at the ordinary temperature and atmospheric pressure. As such a saturated hydrocarbon, for example, n-dodecane, n-decane or the like can be used. The oil phase may be used in the mixture of two or more hydrocarbons.

In addition, a method for producing pentanol from hemicellulose is described in, for example, Sibao Liu et al., Green Chem., 2016, 18, 165-175.

The pentanol can be converted into pentene by dehydration reaction using a known acid catalyst. The resulting pentene includes 1-pentene and 2-pentene. The pentene may be further fractionated into 1-pentene and 2-pentene by a precision distillation operation.

The cellulose-derived hexene can be obtained by, for example, producing hexanol from cellulose contained in lignocellulosic biomass and dehydrating the produced cellulose-derived hexanol. Hexanol can be efficiently obtained from cellulose in a single reaction vessel by a method in which the cellulose in an aqueous phase is saccharified by hydrolysis and also subjected to hydrogenolysis in the presence of an Ir—Re (iridium-rhenium)-based catalyst at a temperature at which cellulose is decomposed, and then an oil phase composed of a liquid hydrocarbon is added to dissolve hexanol (Japanese Patent Laid-Open No. 2016-33129). As the catalyst and the oil phase, the same ones as those described in the aforementioned method for producing hemicellulose-derived pentene can be used. In addition, a method for producing hexanol from cellulose is described in, for example, Sibao Liu et al., ChemSusChem, 2015, 8, 628-635. The hexanol can be converted into hexene by a dehydration reaction using a known acid catalyst. The resulting hexene includes 1-hexene, 2-hexene and 3-hexene. The hexene may be further fractionated into 1-hexene, 2-hexene and 3-hexene by a precision distillation operation.

The hemicellulose-derived pentene and the cellulose-derived hexene may be separately produced from lignocellulosic biomass in different reaction vessels, or both may be produced from lignocellulosic biomass in a single reaction vessel.

The gasoline composition according to the present invention can be obtained, for example, by blending the hemicellulose-derived pentene obtained as described above with a base gasoline component (hereinafter referred to as base gasoline). In the case where the cellulose-derived hexene is blended, the cellulose-derived hexene that is obtained from lignocellulosic biomass in a different reaction vessel from that for hemicellulose-derived pentene may be blended, or the cellulose-derived hexene that is obtained from lignocellulosic biomass in the same reaction vessel as that for hemicellulose-derived pentene may be blended together.

In order to obtain the gasoline composition having above-predetermined properties such as the density, an amount of the hemicellulose-derived pentene to be mixed and the properties of the base gasoline may be adjusted. However, if the content of the hemicellulose-derived pentene is larger, the oxidation stability may become worse, or the fuel economy may be become worse due to the low 50% distillation temperature, as previously described, so that a predetermined amount of the hemicellulose-derived pentene is necessary. The properties of the base gasoline can be adjusted by a known method.

The gasoline composition according to the present invention may be used as a gasoline fuel as such, or may be used after an additive or another component is further added.

The additive includes antioxidants such as phenol-based and amine-based antioxidants, detergents such as polyisobutylene amine compounds, metal deactivators such as amine carbonyl condensation compounds, surface ignition inhibitors such as organophosphorus-based compounds, antistatic agents such as anionic surfactants, cationic surfactants and amphoteric surfactants, and dyes such as azo dyes.

EXAMPLES

Synthesis Example 1: Production of Hemicellulose-Derived Pentene

[Preparation of Catalyst, Etc.]

A chloroiridic acid ($H_2IrCl_6$) aqueous solution was dropped onto silicon dioxide ($SiO_2$) ("CARiACT G-6" manufactured by FUJI SILYSIA CHEMICAL LTD.) to make the whole $SiO_2$ wet, and then the $SiO_2$ was dried at about 90° C. Such wetting and drying steps were repeated to make the Ir content on the whole catalyst to be 4 mass %. Then, drying at 110° C. was further carried out for about half a day. Then, using an ammonium perrhenate ($NH_4ReO_4$) aqueous solution, same wetting and drying steps were repeated to support Ir and Re on silicon dioxide in such a way that the molar ratio of Re to Ir, namely [Re]/[Ir], became 0.25 to 3. Thereafter, calcining was carried out under an air atmosphere at 500° C. for 3 hours to obtain an Ir-ReOx/$SiO_2$ catalyst.

As a reaction vessel, an autoclave having a glass internal tube was used. Around the reaction vessel, an electric furnace was placed so that the interior of the reaction vessel was heated. Further, the reaction vessel was placed on a magnetic stirrer and a magnetic stirrer chip (stirring bar) coated with Teflon (registered trademark) was put inside the internal tube of the reaction vessel to stir the interior. In the reaction vessel, 1.0 part by weight of the Ir-ReOx/$SiO_2$ catalyst and 63.3 parts by weight of water were introduced, and hydrogen substitution was repeated three times or more. When the temperature of the interior of the reaction vessel reached at 200° C., hydrogen was introduced to make the total pressure 8 MPa, and the reaction vessel was maintained at 200° C. for one hour to reduce the catalyst.

[Production of Pentanol]

Xylan, which is a main component of hemicellulose, was subjected to milling treatment in advance. In such milling treatment, 100 $ZrO_2$ balls were put in a drum of a ball mill together with xylan, and milling was carried out at a rotational speed of 300 rpm for 2 hours. If milling is carried out for not shorter than 2 hours, the xylan is sufficiently milled.

To the reaction vessel in which the reduction treatment of the catalyst was carried out as described above, 3.3 parts by weight of the xylan subjected to the above milling treatment were added. To the reaction vessel, 20.0 to 100.0 parts by weight of n-dodecane as an oil phase were added. Then, hydrogen was introduced to make the pressure 6 MPa at room temperature, and the reaction vessel was maintained at 140° C. for 144 hours to obtain hemicellulose-derived pentanol.

[Production of Pentene]

1.0 part by weight of the hemicellulose-derived pentanol obtained by the above process, including at least one of 1-pentanol, 2-pentanol and 3-pentanol was introduced in another reaction vessel (the same type as that of the aforementioned autoclave), then 10.0 parts by weight of tridecane as a solvent and 0.2 parts by weight of zeolite (HZSM-5) as an acid catalyst were added, and nitrogen was introduced to make the pressure 0.6 MPa at room temperature, followed by raising the temperature to a predetermined reaction temperature of 180° C. over a period of about 20 minutes. Immediately after reaching at the reaction temperature, the dehydration reaction products were analyzed. As a result, hemicellulose-derived pentene containing 1-pentene and 2-pentene was obtained.

Synthesis Example 2: Production of Cellulose-Derived Hexene

[Preparation of Catalyst, Etc.]

A catalyst, etc. were prepared in the same manner as in Synthesis Example 1.

[Production of Hexanol]

Lignocellulosic biomass-derived cellulose was subjected to milling treatment in advance. In such milling treatment, 100 $ZrO_2$ balls were put in a drum of a ball mill together with cellulose, and milling was carried out at a rotational speed of 300 rpm for 2 hours. If milling is carried out for not shorter than 2 hours, the cellulose is sufficiently milled.

To the reaction vessel in which the reduction treatment of the catalyst was carried out as described above, 3.3 parts by weight of the cellulose subjected to the milling treatment were added. To the reaction vessel, 20.0 to 100.0 parts by weight of n-dodecane as an oil phase were added. Then, hydrogen was introduced to make the pressure 6 MPa at room temperature, and the reaction vessel was maintained at 190° C. for 24 hours to obtain cellulose-derived hexanol.

[Production of Hexene]

1.0 part by weight of the cellulose-derived hexanol obtained by the above process, including at least one of 1-hexanol, 2-hexanol and 3-hexanol was introduced in a reaction vessel (the same type as that of the aforesaid autoclave), then 10.0 parts by weight of tridecane as a solvent and 0.2 parts by weight of zeolite (HZSM-5) as an acid catalyst were added, and nitrogen was introduced to make the pressure 0.6 MPa at room temperature, followed by raising the temperature to a predetermined reaction temperature of 180° C. over a period of about 20 minutes. Immediately after reaching at the reaction temperature, the dehydration reaction products were analyzed. As a result, cellulose-derived hexene containing 1-hexene, 2-hexene and 3-hexene was obtained.

Synthesis Example 3: Simultaneous Production of Hemicellulose-Derived Pentene and Cellulose-Derived Hexene

[Preparation of Catalyst, Etc.]

A catalyst, etc. were prepared in the same manner as in Synthesis Example 1.

[Production of Pentanol and Hexanol]

Xylan, which is a main component of lignocellulosic biomass-derived hemicellulose, and lignocellulosic biomass-derived cellulose were subjected to milling treatment in advance. In such milling treatment, 100 $ZrO_2$ balls were put in a drum of a ball mill together with xylan and cellulose, and milling was carried out at a rotational speed of 300 rpm for 2 hours. If milling is carried out for not shorter than 2 hours, the xylan and the cellulose are sufficiently milled.

To the reaction vessel in which the reduction treatment of the catalyst was carried out as described above, the xylan and the cellulose subjected to the milling treatment were added in a total amount of 3.3 parts by weight. To the reaction vessel, 20.0 to 100.0 parts by weight of n-dodecane as an oil phase were added. Then hydrogen was introduced to make the pressure 6 MPa at room temperature, and the reaction vessel was maintained at 190° C. for 24 hours to obtain hemicellulose-derived pentanol and cellulose-derived hexanol.

[Production of Pentene and Hexene]

A total amount of 1.0 part by weight of the hemicellulose-derived pentanol obtained by the above process, including at least one of 1-pentanol, 2-pentanol and 3-pentanol, and the cellulose-derived hexanol obtained by the above process, including at least one of 1-hexanol, 2-hexanol and 3-hexanol were introduced in a reaction vessel (the same type as that of the aforesaid autoclave). Then, 10.0 parts by weight of tridecane as a solvent and 0.2 parts by weight of zeolite (HZSM-5) as an acid catalyst were added, and nitrogen was introduced to make the pressure 0.6 MPa at room temperature, followed by raising the temperature to a predetermined reaction temperature of 180° C. over a period of about 20 minutes. Immediately after reaching at the reaction temperature, the dehydration reaction products were analyzed. As a result, hemicellulose-derived pentene containing 1-pentene and 2-pentene and cellulose-derived hexene containing 1-hexene, 2-hexene and 3-hexene were obtained.

Through such synthesis as above, pentene and hexene are each obtained with the isomer ratios in pentene and the isomer ratios in hexene as described in Table 1. Components A to E were prepared in line with compositions described in Table 1.

TABLE 1

| (Vol %) | | A | B | | C | | D | | E | |
|---|---|---|---|---|---|---|---|---|---|---|
| Pentene | 1-Pentene | 12.9 | 1.2 | 43.5 | 4.0 | 54.4 | 4.9 | 100 | 9.1 | |
|  | 2-Pentene |  | 11.7 |  | 39.5 |  | 49.5 |  | 90.9 | |
| Hexene | 1-Hexene | 87.1 | 5.8 | 56.5 | 3.8 | 45.6 | 3.0 |  | | 100 | 6.7 |
|  | 2-Hexene |  | 58.1 |  | 37.7 |  | 30.4 |  | | 66.7 |
|  | 3-Hexene |  | 23.2 |  | 15.1 |  | 12.1 |  | | 26.7 |

Examples 1 to 9, Comparative Examples 1 to 3

The components A to E shown in Table 1 were blended with base gasolines (base RG1, base RG2) in the blend ratios described in Tables 2 to 4, to obtain gasoline compositions according to Examples 1 to 9 (Ex. 1 to Ex. 9) and Comparative Examples 1 to 3 (C.Ex. 1 to C.Ex.3). The properties of the resulting gasoline compositions are shown in Tables 2 to 4. The properties of the base gasolines are also shown in Table 2. The properties shown in Tables 2 to 4 were measured by the following methods.

Density: the density was measured in accordance with JIS K 2249 "Crude petroleum and petroleum products—Determination of density and petroleum measurement tables based on a reference temperature (15 centigrade degrees)".

Vapor pressure: the vapor pressure was measured in accordance with JIS K 2258-1 "Crude petroleum and petroleum products—Determination of vapor pressure—Part 1: Reid method".

Distillation temperature: the distillation temperature was measured in accordance with JIS K 2254 "Petroleum products—Determination of distillation characteristics".

Composition: the composition was measured in accordance with JIS K 2536-2 "Liquid petroleum products—Testing method of components Part 2: Determination of total components by gas chromatography".

Oxidation stability: the oxidation stability was measured in accordance with JIS K 2287 "Gasoline—Determination of oxidation stability—Induction period method".

Octane number: the octane number of base gasoline was measured in accordance with JIS K 2280 "Petroleum products—Fuels—Determination of octane number, cetane number and calculation of cetane index". The octane numbers of Examples and Comparative Examples were calculated from the following equation (1) using an octane number of base gasoline and octane numbers of hemicellulose-derived pentene and cellulose-derived hexene.

$$\text{Octane number} = (\text{octane number of base gasoline} \times \text{blend ratio of base gasoline (vol \%)} \div 100) + (\text{octane number of hemicellulose-derived pentene and/or cellulose-derived hexene} \times \text{blend ratio of hemicellulose-derived pentene and/or cellulose-derived hexene (vol \%)} \div 100) \quad (1)$$

TABLE 2

|  | Unit | BaseRG1 | BaseRG2 | Ex. 1 | Ex. 2 | Ex. 3 |
|---|---|---|---|---|---|---|
| Base RG1 | (Vol %) | 100 | — | 95 | 85 | 80 |
| Base RG2 |  | — | 100 | — | — | — |
| Component A |  | — | — | 5 | 15 | 20 |
| Component B |  | — | — | — | — | — |
| Component C |  | — | — | — | — | — |
| Component D |  | — | — | — | — | — |
| Component E |  | — | — | — | — | — |
| Density | (g/cm³) | 0.7292 | 0.7269 | 0.7281 | 0.7234 | 0.7171 |
| Vapor pressure | (kPa) | 69.3 | 74.8 | 65.3 | 65.3 | 64.9 |
| Distillation |  |  |  |  |  |  |
| IBP | (degree C.) | 27.5 | 29.0 | 29.0 | 31.0 | 32.2 |
| T10 |  | 46.0 | 47.0 | 48.0 | 50.0 | 51.4 |
| T50 |  | 84.5 | 83.5 | 82.5 | 79.0 | 77.1 |
| T90 |  | 156.5 | 157.0 | 155.0 | 151.5 | 149.9 |
| E.P |  | 198.0 | 200.0 | 198.5 | 197.5 | 197.4 |
| Composition |  |  |  |  |  |  |
| Paraffins | (Vol %) | 49.77 | 50.17 | 47.22 | 42.40 | 39.89 |
| Olefins |  | 15.27 | 15.42 | 19.49 | 27.94 | 31.92 |
| Naphthenes |  | 7.82 | 7.79 | 7.37 | 6.65 | 6.44 |
| Aromatics |  | 24.65 | 24.28 | 23.63 | 20.94 | 19.83 |
| ETBE content |  | 2.49 | 2.34 | 2.29 | 2.07 | 1.92 |
| Aromatics analysis |  |  |  |  |  |  |
| C6 | (Vol %) | 0.73 | 0.71 | 0.72 | 0.64 | 0.60 |
| C7 |  | 6.25 | 5.99 | 6.07 | 5.43 | 5.11 |
| C8 |  | 7.39 | 7.10 | 7.11 | 6.34 | 5.97 |
| C9 |  | 5.86 | 5.86 | 5.60 | 4.97 | 4.72 |
| C10+ |  | 4.42 | 4.62 | 4.14 | 3.56 | 3.42 |
| Hexene *1 | (Vol %) | 0 | 0 | 4.35 | 13.06 | 17.42 |
| Pentene *2 | (Vol %) | 0 | 0 | 0.64 | 1.93 | 2.58 |
| Hexene content | (Vol %) | 1.01 | 0.99 | 5.78 | 14.20 | 18.32 |
| 1-Hexene content | (Vol %) | 0.15 | 0.14 | 0.54 | 1.15 | 1.46 |
| 2-Hexene content | (Vol %) | 0.60 | 0.59 | 3.73 | 9.28 | 12.03 |
| 3-Hexene content | (Vol %) | 0.26 | 0.26 | 1.52 | 3.76 | 4.82 |
| Pentene content | (Vol %) | 2.58 | 2.57 | 3.08 | 4.16 | 4.46 |
| 1-Pentene content | (Vol %) | 0.68 | 0.68 | 0.70 | 0.80 | 0.78 |
| 2-Pentene content | (Vol %) | 1.90 | 1.89 | 2.38 | 3.36 | 3.68 |
| 2-PC/1-PC *3 | (Vol %/Vol %) | 2.79 | 2.78 | 3.40 | 4.20 | 4.72 |
| 2-HC/1-HC *4 | (Vol %/Vol %) | 4.00 | 4.21 | 6.91 | 8.07 | 8.24 |
| Oxidation stability | (min) | 735 | 715 | 402 | 348 | 313 |
| Octane number *5 | (—) | 90.8 | 90.8 | 90.9 | 91.0 | 91.1 |

*1: Cellulose-derived hexene
*2: Hemicellulose-derived pentene
*3: 2-Pentene content/1-Pentene content
*4: 2-Hexene content/1-Hexene content
*5: Octane number (calculated value)

TABLE 3

|  | Unit | Ex. 4 | Ex. 5 | Ex. 6 | Ex. 7 | Ex. 8 |
|---|---|---|---|---|---|---|
| Base RG1 | (Vol %) | 75 | 95 | 80 | 95 | 85 |
| Base RG2 |  | — | — | — | — | — |
| Component A |  | 25 | — | — | — | — |
| Component B |  | — | 5 | 20 | — | — |
| Component C |  | — | — | — | 5 | 15 |
| Component D |  | — | — | — | — | — |
| Component E |  | — | — | — | — | — |
| Density | (g/cm³) | 0.7141 | 0.7276 | 0.7158 | 0.7257 | 0.7188 |
| Vapor pressure | (kPa) | 63.8 | 69.3 | 69.4 | 69.7 | 70.6 |
| Distillation |  |  |  |  |  |  |
| IBP | (degree C.) | 33.4 | 30.0 | 37.5 | 29.3 | 33.0 |
| T10 |  | 52.7 | 48.0 | 54.0 | 46.5 | 47.5 |
| T50 |  | 75.3 | 82.5 | 76.5 | 82.0 | 77.0 |
| T90 |  | 148.2 | 155.5 | 152.5 | 155.2 | 152.5 |
| E.P |  | 197.2 | 200.0 | 206.0 | 198.5 | 199.5 |
| Composition |  |  |  |  |  |  |
| Paraffins | (Vol %) | 37.68 | 47.08 | 39.66 | 47.15 | 42.34 |
| Olefins |  | 35.44 | 19.53 | 31.65 | 19.22 | 27.87 |
| Naphthenes |  | 6.14 | 7.41 | 6.48 | 7.61 | 6.83 |
| Aromatics |  | 18.90 | 23.70 | 20.26 | 23.73 | 20.90 |
| ETBE content |  | 1.84 | 2.29 | 1.95 | 2.29 | 2.05 |
| Aromatics analysis |  |  |  |  |  |  |
| C6 | (Vol %) | 0.57 | 0.72 | 0.60 | 0.70 | 0.64 |
| C7 |  | 4.85 | 6.08 | 5.20 | 6.05 | 5.41 |
| C8 |  | 5.71 | 7.15 | 6.11 | 7.14 | 6.31 |
| C9 |  | 4.52 | 5.63 | 4.84 | 5.68 | 4.95 |
| C10+ |  | 3.27 | 4.11 | 3.50 | 4.16 | 3.59 |
| Hexene *1 | (Vol %) | 21.77 | 2.82 | 11.30 | 2.28 | 6.84 |
| Pentene *2 | (Vol %) | 3.22 | 2.17 | 8.70 | 2.72 | 8.16 |
| Hexene content | (Vol %) | 22.06 | 4.33 | 12.27 | 3.72 | 8.10 |
| 1-Hexene content | (Vol %) | 1.74 | 0.41 | 1.00 | 0.36 | 0.64 |
| 2-Hexene content | (Vol %) | 14.51 | 2.76 | 8.03 | 2.34 | 5.31 |
| 3-Hexene content | (Vol %) | 5.80 | 1.16 | 3.24 | 1.02 | 2.16 |
| Pentene content | (Vol %) | 4.86 | 4.56 | 10.22 | 4.89 | 10.05 |
| 1-Pentene content | (Vol %) | 0.80 | 0.93 | 1.38 | 0.88 | 1.39 |
| 2-Pentene content | (Vol %) | 4.06 | 3.64 | 8.84 | 4.01 | 8.67 |
| 2-PC/1-PC *3 | (Vol %/Vol %) | 5.08 | 3.91 | 6.41 | 4.56 | 6.24 |
| 2-HC/1-HC *4 | (Vol %/Vol %) | 8.34 | 6.73 | 8.03 | 6.50 | 8.30 |
| Oxidation stability | (min) | 282 | 534 | 336 | 569 | 387 |
| Octane number *5 | (—) | 91.2 | 90.9 | 91.3 | 90.9 | 91.2 |

*1: Cellulose-derived hexene
*2: Hemicellulose-derived pentene
*3: 2-Pentene content/1-Pentene content
*4: 2-Hexene content/1-Hexene content
*5: Octane number (calculated value)

TABLE 4

|  | Unit | Ex. 9 | C. Ex. 1 | C. Ex. 2 | C. Ex. 3 |
|---|---|---|---|---|---|
| Base RG1 | (Vol %) | 94 | — | 80 | 85 |
| Base RG2 |  | — | 75 | — | — |
| Component A |  | — | — | — | — |
| Component B |  | — | — | — | — |
| Component C |  | — | — | 20 | — |
| Component D |  | 6 | — | — | 15 |
| Component E |  | — | 25 | — | — |
| Density | (g/cm³) | 0.7262 | 0.7202 | 0.7153 | 0.7198 |
| Vapor pressure | (kPa) | 71.8 | 57.4 | 71.0 | 74.7 |
| Distillation |  |  |  |  |  |
| IBP | (degree C.) | 31.0 | 35.0 | 34.8 | 30.5 |
| T10 |  | 46.0 | 54.5 | 48.0 | 44.5 |
| T50 |  | 80.0 | 77.0 | 74.5 | 72.5 |
| T90 |  | 156.0 | 150.0 | 151.2 | 152.0 |
| E.P |  | 200.5 | 194.0 | 200.0 | 197.0 |
| Composition |  |  |  |  |  |
| Paraffins | (Vol %) | 46.74 | 30.85 | 40.18 | 39.08 |
| Olefins |  | 20.13 | 43.39 | 31.74 | 30.94 |
| Naphthenes |  | 7.44 | 5.33 | 6.43 | 6.75 |

TABLE 4-continued

|  | Unit | Ex. 9 | C. Ex. 1 | C. Ex. 2 | C. Ex. 3 |
|---|---|---|---|---|---|
| Aromatics |  | 23.34 | 18.61 | 19.73 | 21.09 |
| ETBE content |  | 2.35 | 1.82 | 1.93 | 2.14 |
| Aromatics analysis |  |  |  |  |  |
| C6 | (Vol %) | 0.69 | 0.53 | 0.60 | 0.63 |
| C7 |  | 5.91 | 4.65 | 5.09 | 5.35 |
| C8 |  | 6.99 | 5.50 | 5.96 | 6.35 |
| C9 |  | 5.54 | 4.50 | 4.70 | 5.01 |
| C10+ |  | 4.21 | 3.43 | 3.38 | 3.75 |
| Hexene *1 | (Vol %) | 0 | 25.00 | 9.12 | 0 |
| Pentene *2 | (Vol %) | 6.00 | 0 | 10.88 | 15.00 |
| Hexene content | (Vol %) | 1.56 | 24.76 | 10.13 | 1.43 |
| 1-Hexene content | (Vol %) | 0.20 | 2.42 | 0.77 | 0.18 |
| 2-Hexene content | (Vol %) | 0.92 | 19.19 | 6.68 | 0.84 |
| 3-Hexene content | (Vol %) | 0.45 | 3.15 | 2.68 | 0.41 |
| Pentene content | (Vol %) | 8.03 | 1.95 | 12.41 | 16.51 |
| 1-Pentene content | (Vol %) | 1.22 | 0.52 | 1.61 | 2.08 |
| 2-Pentene content | (Vol %) | 6.80 | 1.43 | 10.80 | 14.44 |
| 2-PC/1-PC *3 | (Vol %/Vol %) | 5.57 | 2.75 | 6.71 | 6.94 |
| 2-HC/1-HC *4 | (Vol %/Vol %) | 4.60 | 7.93 | 8.68 | 4.67 |
| Oxidation stability | (min) | 622 | 186 | 285 | 515 |
| Octane number *5 | (—) | 91.0 | 91.1 | 91.3 | 91.4 |

*1: Cellulose-derived hexene
*2: Hemicellulose-derived pentene
*3: 2-Pentene content/1-Pentene content
*4: 2-Hexene content/1-Hexene content
*5: Octane number (calculated value)

From Examples 1 to 9, it can be seen that even though not ethanol but hexene and pentene were produced from lignocellulosic biomass and the hexane and the pentene were blended into gasoline, the resulting gasoline satisfied properties required for gasoline. However, as shown in Comparative Examples 1 to 3, it can be seen that when a large amount of hexene or pentene was contained, oxidation stability became worse, or fuel economy became worse due to the low 50% distillation temperature.

Through the above production of pentene, pentene is obtained with the isomer ratios in pentene as described in Table 5. Components F to I were prepared in line with compositions described in Table 5.

TABLE 5

|  |  | Component | | | | | | | |
|---|---|---|---|---|---|---|---|---|---|
| (vol %) |  | F | | G | | H | | I | |
| Pentene | 1-Pentene | 100 | 5.9 | 100 | 7.9 | 100 | 11.8 | 100 | 13.8 |

TABLE 5-continued

|  | Component | | | |
|---|---|---|---|---|
| (vol %) | F | G | H | I |
| 2-Pentene | 94.1 | 92.1 | 88.2 | 86.2 |

Examples 10 to 13

The components F to I shown in Table 5 were blended with base gasoline (base RG3) in the blend ratios described in Table 6, to obtain gasoline compositions according to Examples 10 to 13 (Ex.10 to Ex.13). The properties of the resulting gasoline compositions are shown in Table 6. The properties of the base gasoline are also shown in Table 6. The properties shown in Table 6 were measured in the same manner as in Example 1.

TABLE 6

|  | Unit | BaseRG3 | Ex. 10 | Ex. 11 | Ex. 12 | Ex. 13 |
|---|---|---|---|---|---|---|
| Base RG3 | (vol %) | 100 | 95 | 95 | 95 | 95 |
| Component F |  | — | 5 | — | — | — |
| Component G |  | — | — | 5 | — | — |
| Component H |  | — | — | — | 5 | — |
| Component I |  | — | — | — | — | 5 |
| Density | (g/cm³) | 0.7291 | 0.7252 | 0.7214 | 0.7178 | 0.7144 |
| Vapor pressure | (kPa) | 63.8 | 66.2 | 68.4 | 70.6 | 72.7 |
| Distillation |  |  |  |  |  |  |
| IBP | (degree C.) | 37.0 | 35.0 | 35.5 | 37.5 | 37.5 |
| T10 |  | 51.0 | 50.0 | 50.0 | 52.5 | 51.5 |
| T50 |  | 81.5 | 79.5 | 79.0 | 82.0 | 81.0 |
| T90 |  | 159.0 | 158.0 | 158.5 | 160.0 | 160.0 |
| E.P |  | 199.0 | 201.5 | 201.0 | 204.0 | 203.0 |

TABLE 6-continued

| | Unit | BaseRG3 | Ex. 10 | Ex. 11 | Ex. 12 | Ex. 13 |
|---|---|---|---|---|---|---|
| Composition | | | | | | |
| Paraffins | (Vol %) | 50.99 | 47.46 | 47.65 | 46.57 | 46.92 |
| Olefins | | 12.14 | 16.15 | 16.33 | 16.01 | 16.13 |
| Naphthenes | | 7.69 | 7.44 | 7.38 | 7.58 | 7.52 |
| Aromatics | | 23.71 | 23.76 | 23.42 | 24.53 | 24.13 |
| ETBEcontent | | 5.47 | 5.18 | 5.23 | 5.32 | 5.30 |
| Aromatics analysis | | | | | | |
| C6 | (Vol %) | 0.67 | 0.64 | 0.64 | 0.66 | 0.65 |
| C7 | | 4.84 | 4.74 | 4.71 | 4.91 | 4.85 |
| C8 | | 7.71 | 7.70 | 7.59 | 7.96 | 7.84 |
| C9 | | 5.68 | 5.75 | 5.65 | 5.95 | 5.83 |
| C10+ | | 4.80 | 4.93 | 4.81 | 5.05 | 4.96 |
| Hexene *1 | (Vol %) | 0 | 0 | 0 | 0 | 0 |
| Pentene *2 | (Vol %) | 0 | 5.00 | 5.00 | 5.00 | 5.00 |
| Hexene content | (Vol %) | 0.75 | 0.70 | 0.72 | 0.73 | 0.73 |
| 1-Hexene content | (Vol %) | 0.13 | 0.12 | 0.12 | 0.12 | 0.12 |
| 2-Hexene content | (Vol %) | 0.44 | 0.41 | 0.42 | 0.42 | 0.42 |
| 3-Hexene content | (Vol %) | 0.19 | 0.18 | 0.18 | 0.19 | 0.19 |
| Pentene content | (Vol %) | 2.28 | 6.67 | 6.91 | 6.69 | 6.79 |
| 1-Pentene content | (Vol %) | 0.70 | 1.02 | 1.26 | 1.29 | 1.36 |
| 2-Pentene content | (Vol %) | 1.58 | 5.64 | 5.65 | 5.39 | 5.42 |
| 2-PC/1-PC *3 | (Vol %/Vol %) | 2.24 | 5.52 | 4.48 | 4.17 | 3.98 |
| 2-HC/1-HC *4 | (Vol %/Vol %) | 3.49 | 3.51 | 3.51 | 3.52 | 3.52 |
| Oxidation stability | (min) | 980 | 1070 | 1000 | 940 | 960 |
| Octane number *5 | (—) | 90.4 | 90.6 | 90.6 | 90.6 | 90.6 |

*1: Cellulose-derived hexene
*2: Hemicellulose-derived pentene
*3: 2-Pentene content/1-Pentene content
*4: 2-Hexene content/1-Hexene content
*5: Octane number (calculated value)

From Examples 10 to 13, it can be seen that even though not ethanol but pentene was produced from lignocellulosic biomass and the pentene was blended into gasoline, the resulting gasoline satisfied properties required for gasoline.

What is claimed is:

1. A gasoline composition comprising 0.3 to 10.0 vol % of hemicellulose-derived pentene, 3.08 to 12.0 vol % of a pentene content including the hemicellulose-derived pentene, 1.0 to 23.0 vol % of cellulose-derived hexene, and 3.72 to 27.0 vol % of a hexene content including the cellulose-derived hexene, and having a ratio of (2-pentene content) to (1-pentene content) of 3.0 to 7.0 vol %/vol %, and a ratio of (2-hexene content) to (1-hexene content) of 6.50 to 9.0 vol %/vol %, wherein the gasoline composition has a density at 15° C. of 0.7100 to 0.7300 g/cm$^3$, a vapor pressure of 44.0 to 93.0 kPa, a 10% distillation temperature of 38.0 to 60.0° C., a 50% distillation temperature of 75.0 to 100.0° C., a 90% distillation temperature of 110.0 to 170.0° C., and an oxidation stability of not less than 240 minutes, wherein the oxidation stability is measured in accordance with JIS K 2287 "Gasoline-Determination of oxidation stability-Induction period method".

2. The gasoline composition according to claim 1, wherein
the hemicellulose-derived pentene includes 5.0 to 15.0 vol % of 1-pentene and 85.0 to 95.0 vol % of 2-pentene.

3. The gasoline composition according to claim 1, wherein
the cellulose-derived hexene includes 1.0 to 15.0 vol % of 1-hexene, 55.0 to 80.0 vol % of 2-hexene, and 10.0 to 40.0 vol % of 3-hexene.

* * * * *